United States Patent
Alvo et al.

(10) Patent No.: US 10,453,112 B2
(45) Date of Patent: Oct. 22, 2019

(54) METHODS, APPARATUS, AND COMPUTER READABLE MEDIUM FOR CONVERTING ONE-TIME BUYERS OF A PRODUCT/SERVICE INTO SUBSCRIBERS

(71) Applicant: OrderGroove, Inc., New York, NY (US)

(72) Inventors: Greg Alvo, New York, NY (US); Jorge Escobar, New York, NY (US)

(73) Assignee: OrderGroove, Inc., New York, NY (US)

( * ) Notice: Subject to any disclaimer, the term of this patent is extended or adjusted under 35 U.S.C. 154(b) by 0 days.

(21) Appl. No.: 13/962,213

(22) Filed: Aug. 8, 2013

(65) Prior Publication Data

US 2014/0279215 A1 Sep. 18, 2014

Related U.S. Application Data

(60) Provisional application No. 61/791,873, filed on Mar. 15, 2013.

(51) Int. Cl.
G06Q 30/06 (2012.01)

(52) U.S. Cl.
CPC ................ *G06Q 30/0633* (2013.01)

(58) Field of Classification Search
CPC .................................................. G06Q 30/0633
USPC ...................... 705/26.1–27.2, 26.8
See application file for complete search history.

(56) References Cited

U.S. PATENT DOCUMENTS

| | | | |
|---|---|---|---|
| 4,814,996 A | 3/1989 | Wang | |
| 5,090,734 A | 2/1992 | Dyer et al. | |
| 6,415,262 B1 * | 7/2002 | Walker | G06Q 30/02 |
| | | | 705/14.25 |
| 6,963,848 B1 | 11/2005 | Brinkerhoff | |
| 7,251,617 B1 * | 7/2007 | Walker | G06Q 20/085 |
| | | | 705/14.27 |
| 7,295,990 B1 | 11/2007 | Braumoeller et al. | |
| 7,340,414 B2 | 3/2008 | Roh et al. | |
| 7,540,767 B1 | 6/2009 | Czarnecki | |
| 7,552,068 B1 | 6/2009 | Brinkerhoff | |
| 7,747,543 B1 | 6/2010 | Braumoeller et al. | |
| 7,953,645 B2 | 5/2011 | Kerker et al. | |
| 8,121,876 B1 | 2/2012 | Braumoeller et al. | |
| 8,353,448 B1 * | 1/2013 | Miller et al. | 235/379 |
| 8,458,051 B1 * | 6/2013 | Saltzman | G06Q 10/06 |
| | | | 705/26.7 |
| 8,924,262 B2 | 12/2014 | Shuster | |
| 2002/0161652 A1 | 10/2002 | Paullin et al. | |

(Continued)

OTHER PUBLICATIONS

Anonymous, Amazon.com Launches Magazines Store; Customers Can Now Purchase Magazine Subscriptions for Themselves or as Gifts on Amazon.com, Oct. 30, 2001, Business Wire, pp. 1-2. (Year: 2001).*

*Primary Examiner* — Jason B Dunham
*Assistant Examiner* — Brittany E Bargeon
(74) *Attorney, Agent, or Firm* — Kokka & Backus, PC

(57) ABSTRACT

Methods, apparatus, and computer readable media for the incorporation of a subscription ordering system into online merchants' websites. The subscription order systems build subscription offers, inject those offers into the merchants' websites, receive subscription offer acceptances, build the subscription orders, and send them to the merchants' websites.

10 Claims, 9 Drawing Sheets

(56) References Cited

U.S. PATENT DOCUMENTS

| | | |
|---|---|---|
| 2002/0161670 A1* | 10/2002 | Walker ............... G06Q 30/02 |
| | | 705/26.1 |
| 2003/0004784 A1 | 1/2003 | Li et al. |
| 2003/0212614 A1 | 11/2003 | Chu et al. |
| 2004/0111326 A1 | 6/2004 | Rock et al. |
| 2005/0150951 A1 | 7/2005 | Sacco et al. |
| 2005/0165656 A1* | 7/2005 | Frederick et al. ............ 705/26 |
| 2008/0015951 A1 | 1/2008 | Kerker et al. |
| 2008/0071626 A1 | 3/2008 | Hill |
| 2009/0024801 A1* | 1/2009 | Choi ............... G06F 17/30902 |
| | | 711/144 |
| 2010/0102082 A1 | 4/2010 | Ebrom et al. |
| 2010/0217450 A1 | 8/2010 | Beal et al. |
| 2011/0032070 A1 | 2/2011 | Bleile |
| 2011/0054935 A1 | 3/2011 | Hardaway |
| 2011/0251807 A1 | 10/2011 | Rada et al. |
| 2011/0258072 A1 | 10/2011 | Kerker et al. |
| 2012/0004977 A1* | 1/2012 | Daniels et al. ............ 705/14.41 |
| 2012/0036045 A1* | 2/2012 | Lowe et al. ............... 705/26.44 |
| 2012/0124859 A1 | 5/2012 | May et al. |
| 2012/0150461 A1 | 6/2012 | Ohiwa et al. |
| 2012/0150677 A1 | 6/2012 | Shuster |
| 2014/0012706 A1* | 1/2014 | Foerster ................ 705/26.81 |

* cited by examiner

METHODS, APPARATUS, AND COMPUTER READABLE MEDIUM FOR CONVERTING ONE-TIME BUYERS OF A PRODUCT/SERVICE INTO SUBSCRIBERS

CROSS-REFERENCE TO RELATED APPLICATIONS

This application claims priority to U.S. Provisional Patent Application Ser. No. 61/791,873, filed Mar. 15, 2013, which is hereby incorporated by reference in its entirety as if set forth in full herein.

FIELD OF THE INVENTION

The present disclosure relates to internet-based subscription management. More specifically, the present disclosure relates to a subscription promotion system for online merchants.

BACKGROUND OF THE INVENTION

Prior to the advent of Internet-based shopping, retailers and service providers grew accustomed to maintaining a loyal following of regular customers. Due to limited access to information about prices, quality of goods and services, and customer service provided by the retailers and/or service providers, a customer was likely to seek out a source for a particular good or service once and, if pleased with the good or service, return to the retailer or service provider for subsequent purchases.

As the Internet has progressed in the past several years, retailers and service providers have established online stores. As more and more retailers and service providers establish these online stores, customers' ability to access information pertinent to the retailers and service providers is increased dramatically. Instead of regularly returning to a particular retailer or service provider that the customers had become accustomed to frequently purchasing from, the customers are now able to seek out the most attractive offer for each of their individual purchases.

While this increase in access to information might be beneficial to the customers, retailers and service providers may, as a result, experience unpredictable fluctuations in purchases as well as difficulty retaining customers due to this increase in Internet-based information and the resulting purchases.

SUMMARY

Embodiments provide subscription platforms that can be incorporated into merchant webpages to implement a subscription service on pre-existing online stores. In accordance with the embodiments, subscription platforms are provided that respond at least in part to the foregoing issues and/or other issues. Platforms of the current embodiment enable Internet-based retailers or service providers (hereinafter "merchants") to add subscription services to their existing online stores.

In one embodiment, the presently disclosed subject matter (hereinafter "system") receives from the merchant's website an indication that a potential customer has accessed a web page pertaining to a product or service. The system, in response to the indication, builds a subscription offer pertaining to the product or service. The system sends the subscription offer to the merchant's website. If the customer accepts the subscription offer, the system receives an indication from the merchant's website and the system builds a subscription order pertaining to the accepted subscription offer. At a time determined by the accepted subscription offer, the system sends the subscription order to the retailer or service provider's website.

The system can determine whether a subscription is available prior to building the subscription offer. In various embodiments, the system builds content pertaining to a product related to the subscription offer and sends that content to the merchant's website for presentation to the customer. In further embodiments, the subscription offer may be contained in a widget, a module, etc. The widget of the current embodiments deploys to the merchant's website an application program interface that receives the subscription order pertaining to the accepted subscription offer. The system can deploy a module to the retailer's or service provider's website that conveys terms of the subscription offer.

BRIEF DESCRIPTION OF THE DRAWINGS

Various novel and non-obvious features of the disclosed subject matter are set forth in the claims. The disclosed subject matter itself, however, as well as modes of use, will best be understood by reference to the detailed description when read in conjunction with the accompanying drawings, wherein:

DETAILED DESCRIPTION OF ILLUSTRATIVE EMBODIMENTS

Reference is now made to the drawings, in which the same reference numbers are used throughout the different figures to designate the same components.

The subscription platform and related external components and methods (hereinafter, the "system") of the current embodiments provide subscription-related content and offers to Internet-based merchants. The system of the current embodiments also responds to a subscription offer accepted by a merchant's customer by creating a related subscription order.

Figure 1:
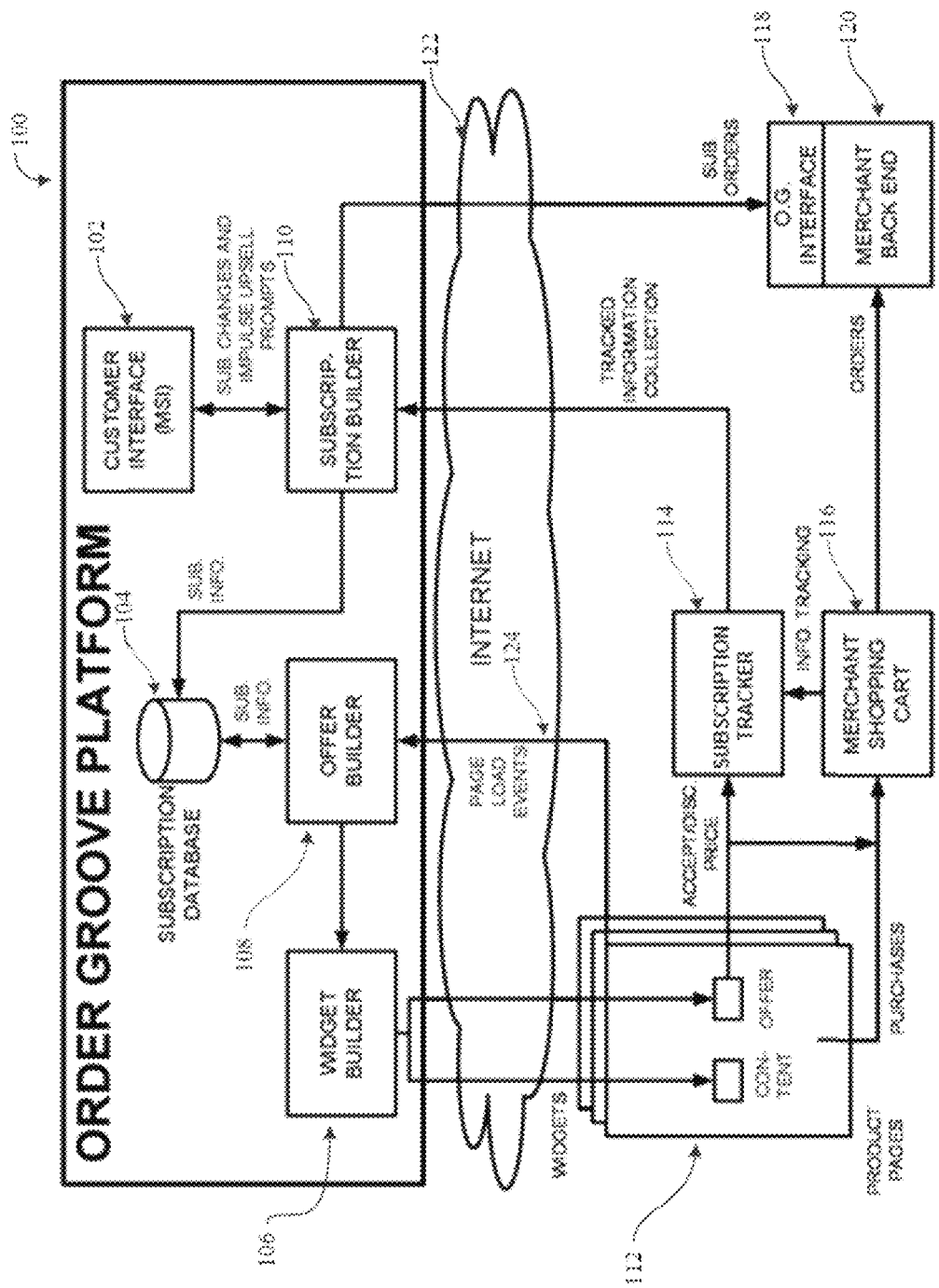
FIG. 1 depicts one embodiment of the method in which the system tracks and collects information, builds subscription offers, and delivers those subscription offers to the merchant's website.

FIG. 1 depicts one embodiment of the method in which the system 100 interacts with a merchant's product or service webpage. When the system receives from the merchant an indication of a product-page load status on the merchant website the offer builder 108 determines if a subscription is available via the subscription database 104. If a subscription is available the subscription offer is injected into the merchant's webpage via the widget builder 106. The injected subscription offer is displayed on the merchant's product or service page 112 in the current embodiment.

The subscription tracker 114 tracks the information contained in the merchant's online shopping cart 116. Subscription tracker 114 and the cart 116 also receives an indication when a subscription offer was accepted by a customer. The subscription builder 110 receives a notification from the subscription tracker 114 when the customer accepts the subscription offer. The subscription builder 110 handles the subscription order.

The customer interface 102 is accessible to a customer that has accepted a subscription offer. The customer interface 102 allows a customer to edit the terms of a subscription. The subscription builder 110 is notified when there is a change to the subscription via the customer interface 102 and can re-build the subscription if necessary.

When an online merchant's customer is ready to purchase the merchant's good or service they navigate to the merchant back end 120. The system's subscription information is incorporated into the merchant back end 120.

Figure 2:
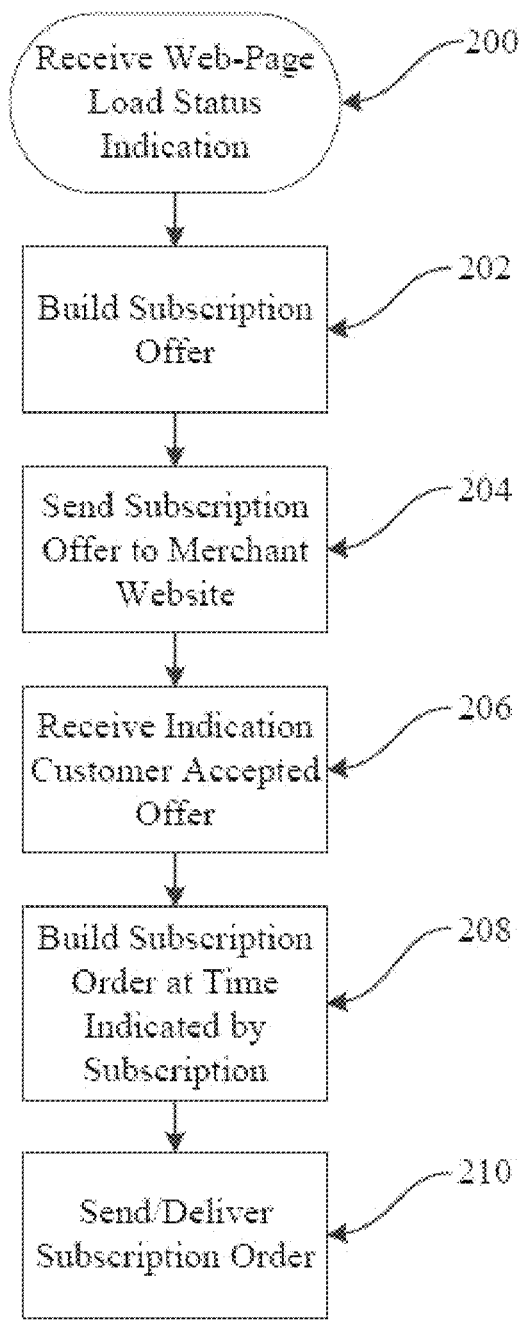
FIG. 2 depicts one embodiment of the subscription ordering system as an overview.

FIG. 2 depicts one embodiment of the process flow of the system. When an action occurs on a merchant's product or service webpage the system receives a load status indication 200 from an online merchant's webpage.

In some embodiments, the system builds a subscription offer at reference 202 in response to a load status indication from the merchant's webpage. In other embodiments, the system can first determine if a subscription is available for the particular product or service related to the received load status indication.

Once a subscription offer is prepared, the system injects the subscription offer into the merchant's product or service webpage. See reference 204. In some embodiments, the system can enter a wait state after injecting the subscription offer into the merchant's webpage. In other embodiments, the system can monitor the customer's activity on the merchant's webpage to determine if the subscription offer was accepted or not.

The system receives an indication that the subscription offer was accepted. See reference 206. The system subsequently builds a subscription order based on the accepted subscription offer at a time indicated in the accepted subscription offer. See reference 208. At that time, the system sends the subscription order pertaining to the accepted subscription offer to the merchant website via the network interface. See reference 210.

Figure 3:
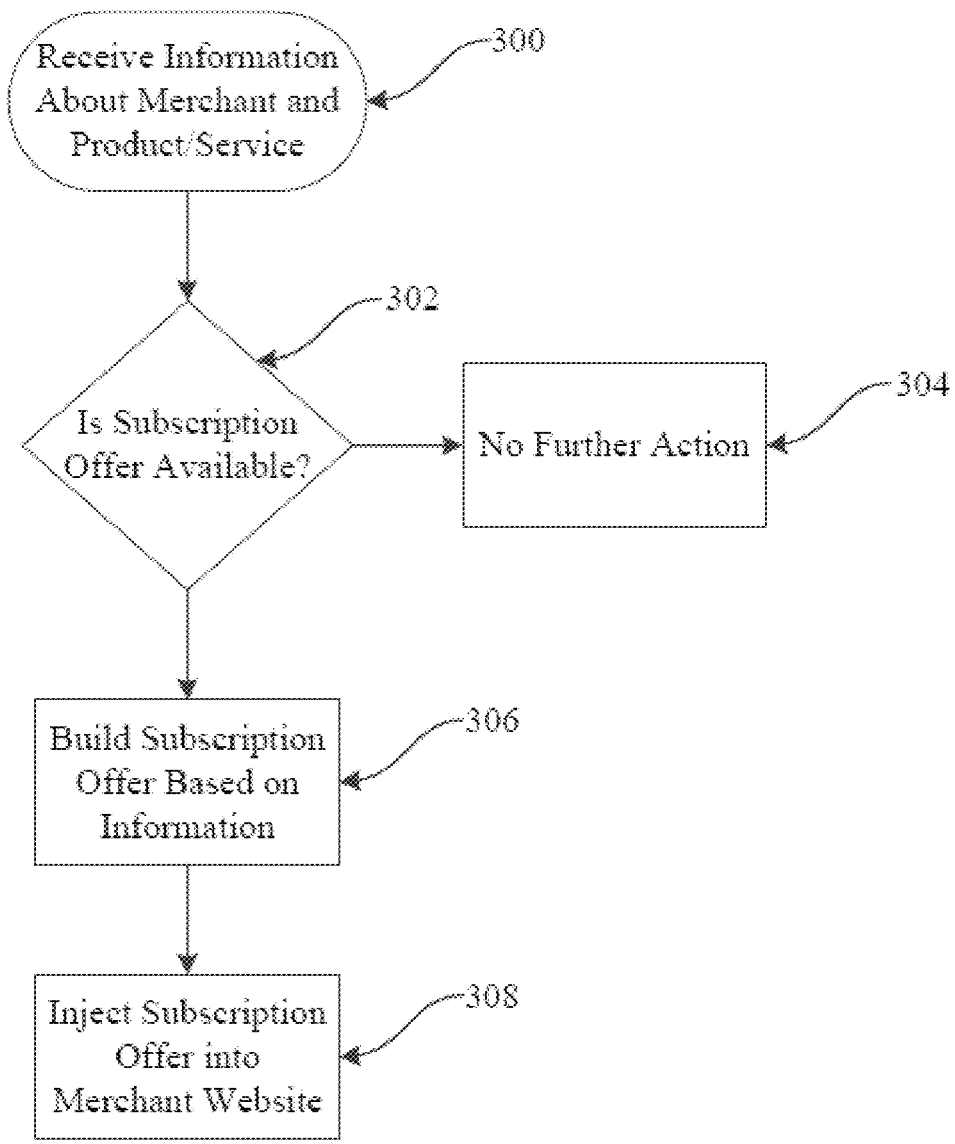
FIG. 3 depicts one embodiment of the process of building a subscription offer.

FIG. 3 depicts one embodiment of the process in which the system determines if a subscription is available for a particular product or service and subsequently builds and delivers a subscription offer for said product or service.

The system receives information related to a product or service webpage on a merchant's website at reference 300. In one embodiment, the information related to the product or service is a product or service identifier. In other embodiments, the information can be an alpha-numeric merchant identifier and an alpha-numeric product or service identifier such that the system can determine subscription availability.

The system determines if a subscription offer is available. See reference 302. In some embodiments, the system can determine whether a subscription offer is available via a database containing available subscriptions. In other embodiments, the system can determine if a subscription is available by communicating with the merchant and/or the merchant's website.

If the system determines that no subscription is available, the system will not pursue further the subscription building process at reference 304.

On the other hand, if the system determines that a subscription is available at reference 302, the system will process the product or service information and build a subscription offer at reference 306. In some embodiments, the subscription offer comprises an offer to the customer that will allow them to have the particular product or service pertaining to the subscription ordered on terms in accordance with the subscription. In other embodiments, the subscription offer can include incentives to encourage the customer to accept the subscription offer. In some embodiments, the incentive can include a discounted price for the good or service. In other embodiments, the incentive can include reduced shipping and/or handling charges, coupons for other goods or services offered by the merchant, etc.

Once the subscription offer is built, the subscription offer is injected into the merchant's website at reference 308. In some embodiments, the subscription offer is an add-on module to the merchant's website, such that the customer can see both the entire merchant's webpage as well as the content injected into that webpage by the system. In other embodiments, the system injects webpage code into the merchant's webpage so that the system's additions perform such operations on the merchant's webpage.

Figure 4:
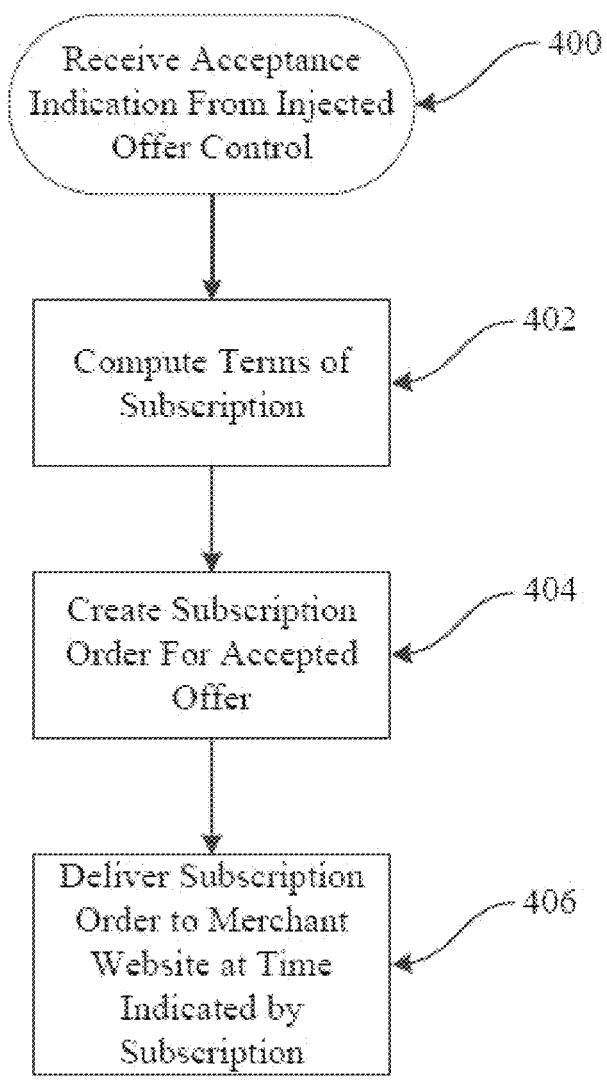
FIG. 4 depicts one embodiment of the process of building a subscription order.

FIG. 4 depicts one embodiment of the system's response to an indication that a subscription offer was accepted and other related information. The system receives an indication when the customer accepts the subscription offer at reference 400. In some embodiments, the merchant's customer can accept the subscription offer via a button injected into the merchant's webpage by the system. In other embodiments, the subscription offer can be accepted when the customer selects a subscription offer acceptance indicator and adds the product or service to their online shopping cart.

After receiving the subscription acceptance notification at reference 400, the system computes the terms of the subscription at reference 402. The subscription terms can include the date of the subscription order, the price of the good or service, etc.

Once the terms of the subscription offer are computed at reference 402, the system creates a subscription order at reference 404 from a variety of information collected during the subscription process. The system delivers the subscription order to the merchant website at a time indicated in the accepted subscription offer at reference 406. The information sent from the system to the merchant's website allows the merchant website to extract the order related information from each subscription related order and places the orders accordingly. It is the merchant website of the current embodiment, therefore, that processes each of these orders. Note also that each of these orders is for the product on the particular product page from which the subscription offer arose.

Figure 5:
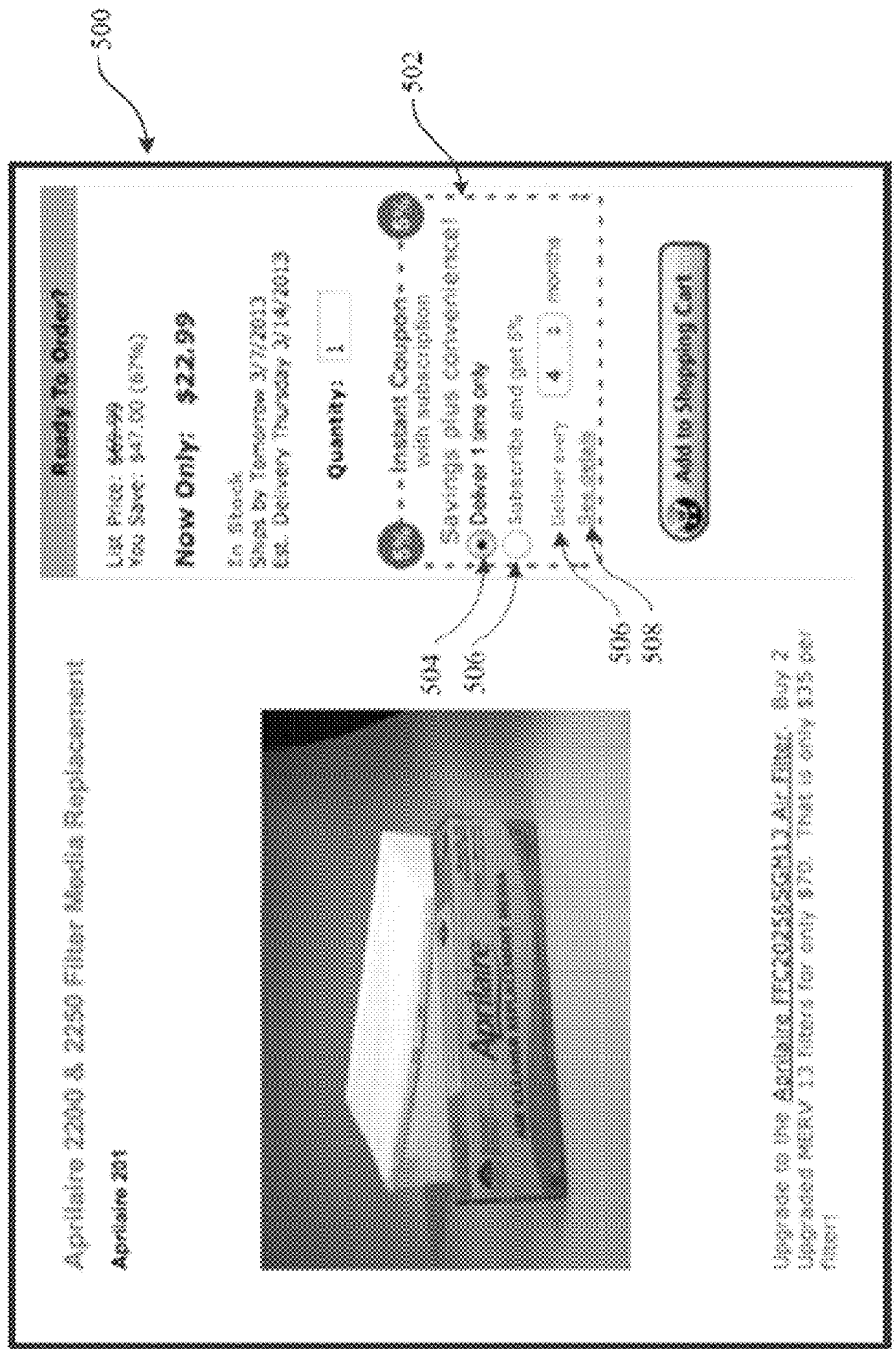
FIG. 5 depicts a screenshot of one embodiment of a merchant's product page with a subscription offer being displayed.

FIG. 5 depicts a screenshot of a merchant's product webpage 500. The system has injected a subscription offer 502 into the merchant's product webpage. The injected subscription offer includes the option to deliver the product only once 504. This can be equated to the customer not accepting the subscription offer. The merchant shopping cart 116 can process such orders. The injected subscription offer also includes the option to deliver the product 506 in accordance with the terms of the offered subscription. This includes the incentive of an offer for a discounted price for the product. In addition, the injected offer includes various options 508 and a hyperlink 510 which allows the customer to view the terms of the subscription offer.

Figure 6:
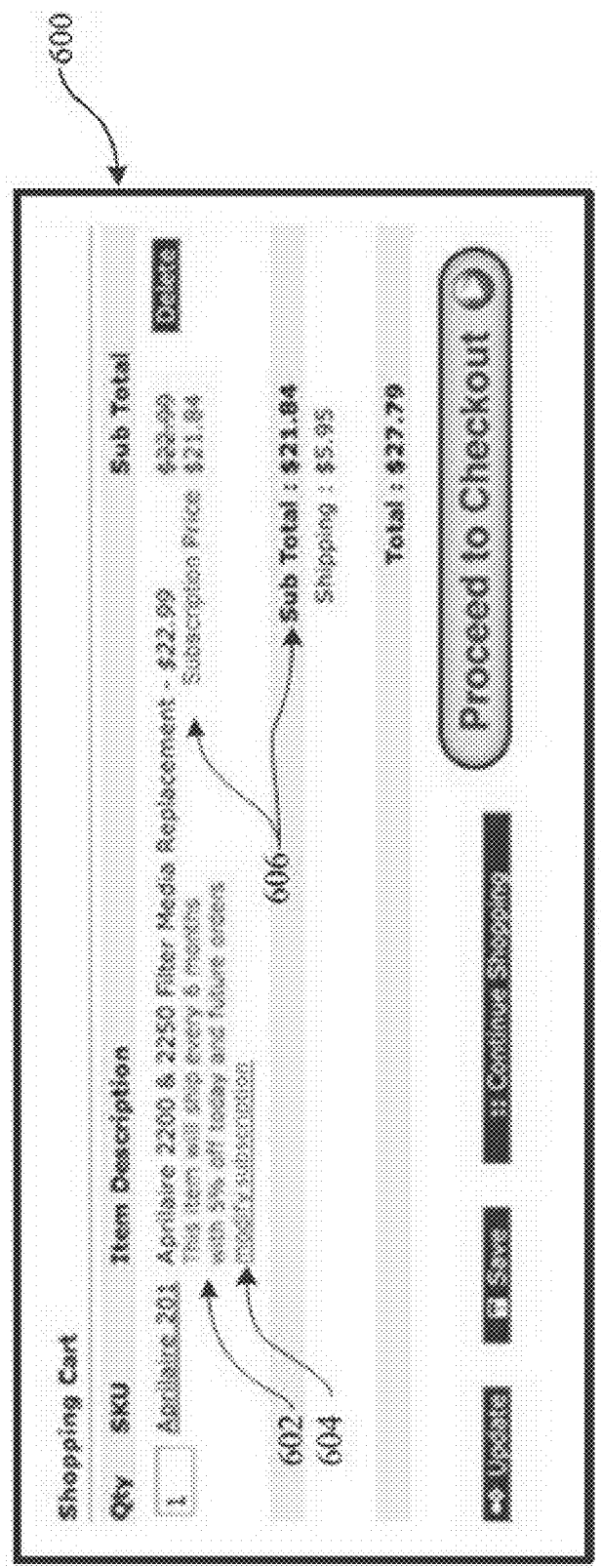
FIG. 6 displays a screenshot of one embodiment of a merchant's online shopping cart with an accepted subscription offer applied.

FIG. 6 depicts a screenshot of a customer's shopping cart 600 on a merchant's website with the subscription related information injected by the system. The subscription terms 602 are displayed to the customer for review. In addition, the option to modify the subscription and/or its terms 604 is available. The discounted price 606 is injected into the merchant's webpage as well.

Figure 7:
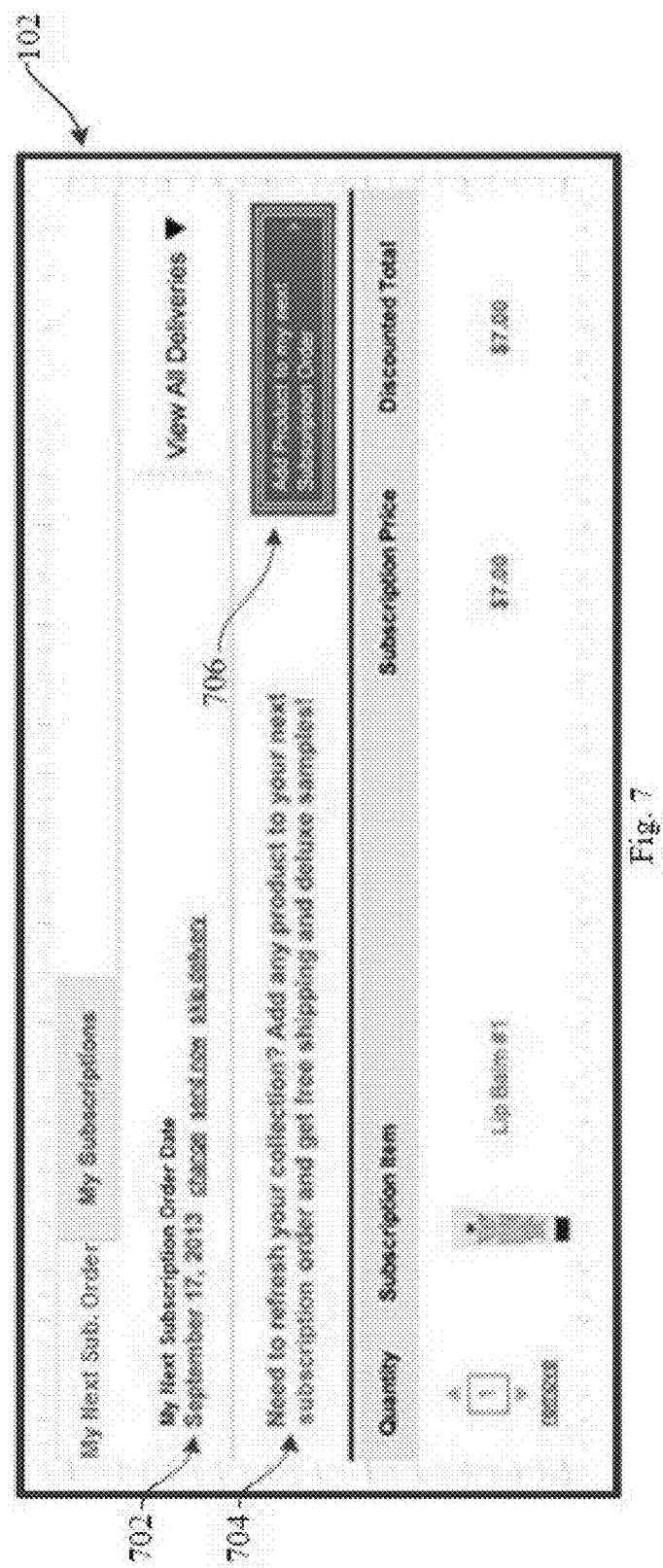
FIG. 7 displays a screenshot of one embodiment of a merchant's customer interface.

FIG. 7 depicts a screenshot of one embodiment of the customer interface 102. The customer interface 102 contains information related to the customer's subscription, options for modification of the subscription, and other subscription related content. The customer interface 102 displays the date of the next subscription order 702, per the terms of the subscription, as well as hyperlinks that allow the customer to edit their subscription details. Multiple individual subscriptions can be managed by the customer via the subscription interface simultaneously.

In some embodiments, the system can also inject an offer 704 to the customer to add another product which is available from that merchant. In this case, the system receives an indication that the customer has selected the product offer when the customer selects the add product button 706.

Figure 8:
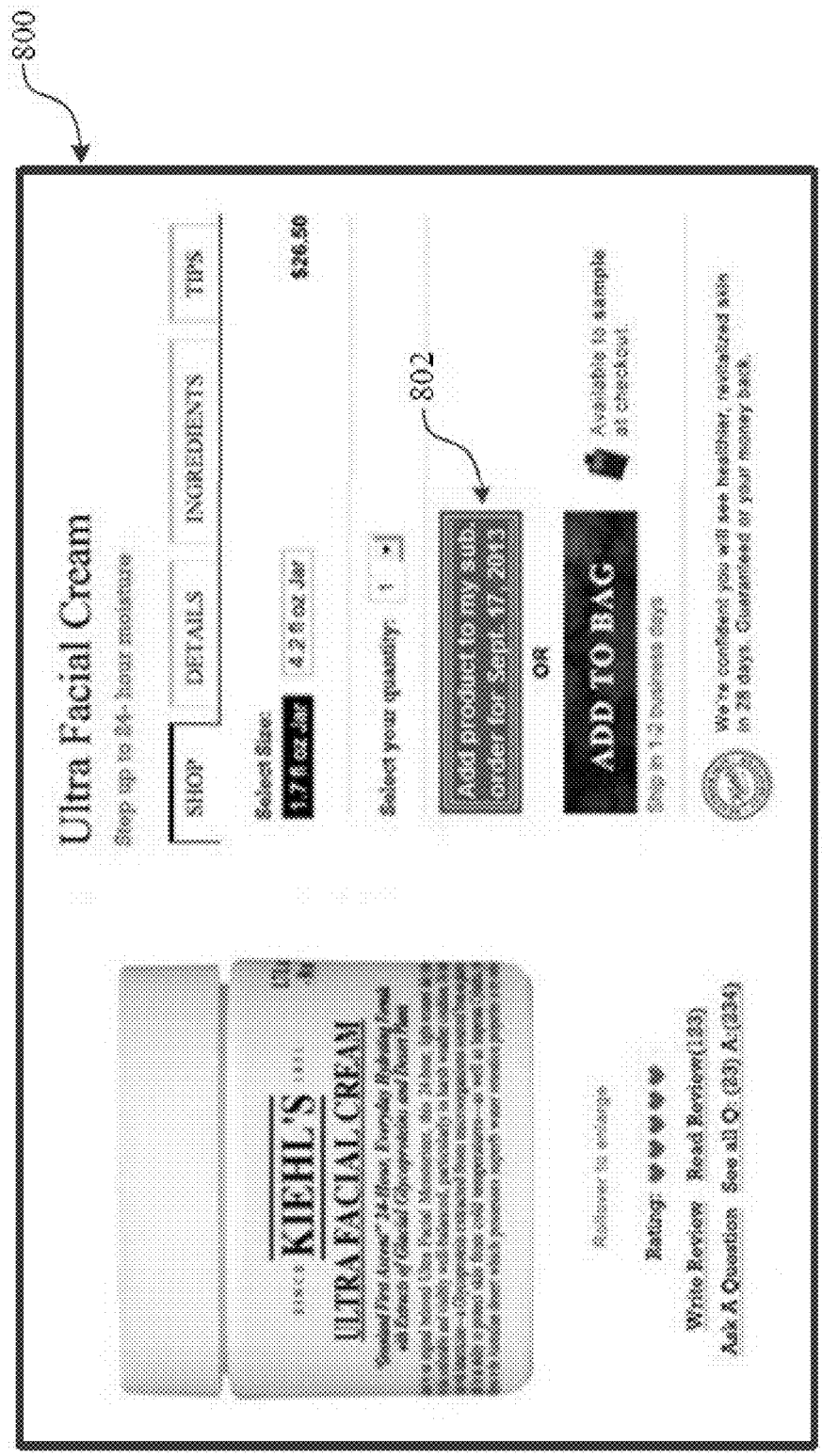
FIG. 8 displays a screenshot of one embodiment of a merchant's product page with an option to add the product to the customer's subscription order injected into the page.

FIG. 8 depicts a screenshot of a merchant's product page 800. The system has injected an offer 802 to add the product related to the product page 800 to an already existing subscription order.

Figure 9:
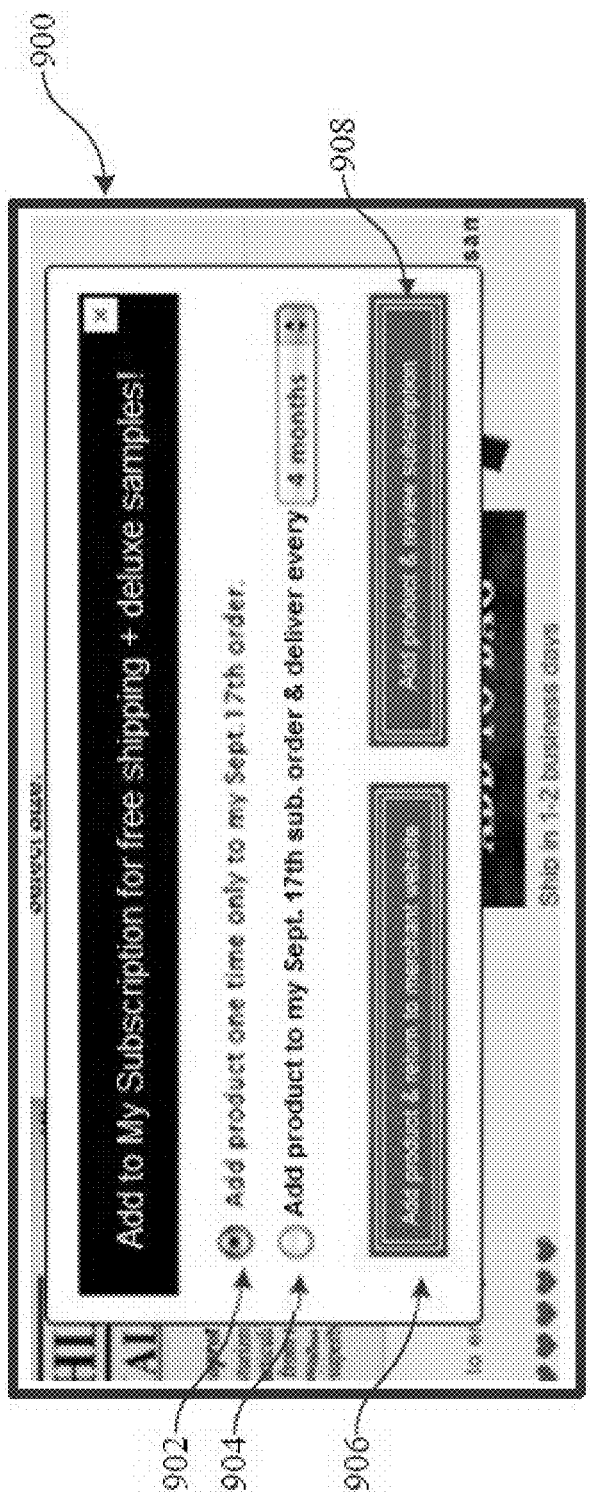
FIG. 9 displays a screenshot of one embodiment of a subscription offer for a customer that has already accepted another subscription offer.

FIG. 9 depicts a screenshot of the webpage response 900 in relation to a customer selecting the subscription offer 802 from FIG. 8. The pop-up window provides the customer with several options related to the subscription offer. In the current embodiment, the first option is to add the product to an existing subscription order 902 for one-time delivery in accordance with the terms of the subscription. In addition, the option to add the product to an existing subscription order and/or modify the subscription order 904 for the product is available. The system collects information related to which selection is made. If the system receives a notification that option 904 was chosen, the frequency for the subscription order related to the product is also received and the subscription order is modified accordingly.

An option to add the product to the customer's online subscription order and return to the merchant's website 906 as well as an option to add the product to the customer's subscription order and to be transferred to a subscription order review webpage 908 are injected by the system. In some embodiments, the system can collect additional information related to the subscription offer 904 such as the quantity of the product desired. In other embodiments, the subscription offer 904 can include incentives to encourage the customer to accept the subscription offer.

Embodiments of the system 100 can provide subscription-related content and subscription-related offers to merchant webservers. The system responds to accepted subscription offers by creating subscription orders and sending them to the merchant websites 112 in accordance with the subscriptions.

Various embodiments of the system 100 operate in an e-commerce environment that includes the Internet 122 or some other wide area network (WAN) to facilitate communications among various parties. These parties include merchants, their customers, and the system. The independent merchant websites typically include numerous product pages 112. Each of these product pages provides information pertaining to a particular and corresponding product to the customers. The independent merchant websites also include shopping carts 116 or similar e-commerce mechanisms to receive, process, accept payment for, and fulfill orders placed by the customers with the merchants. These e-commerce mechanisms would often exist on the merchant website with or without the remainder of the system.

Embodiments of the system allow customers to subscribe to various products while the independent merchants deliver the products in accordance with orders received via shopping carts 116 operated by those merchants. The system 100 does, however, manage the subscription process.

When a customer navigates to a particular merchant website, the merchant website presents to the customer the various product pages 112. The customer browses through these product pages 112 and/or navigates to particular product page 112 according to their interests and desires. The system 100 does not consider in its processing how the customer navigates to a particular product page.

In some embodiments, the system 100 can track the progress of activities in the customer's shopping cart 116 by implementing a controller script that waits until a product page 112 is fully loaded. The system receives an indication 124 from the merchant's website that includes the user's session ID, the merchant's ID, a product ID, etc. The system can use the foregoing information to determine if a product subscription is available. If a subscription is available, the system produces and delivers a subscription offer to the merchant's website.

In various embodiments, the injected offer includes a hypertext markup language (HTML) control that allows the customer to accept the subscription offer. This control does not provide the customer with the capability of actually ordering the product. Rather, this control operates only in the context of accepting the subscription offer. In those situations in which the customer accepts the subscription offer, the system receives an indication of that acceptance. The controller script computes the discounted, subscription-based price for the product and sends that information to the merchant's shopping cart 116 for that customer.

Once the customer completes their shopping, the system 100 creates subscriptions for each product that corresponds to an accepted subscription offer and stores pertinent subscription-related information in a subscription database 104. Thus, as it relates to subscription offers, the system of the current embodiment operates independently of the merchant website. Moreover, the system of the current embodiment manages only the subscriptions and not the customer's orders.

It might be worth noting that a subscription is a contractual agreement between the merchant and the customer whereby the customer often receives a discounted rate on a given product in return for agreeing to purchase that product from the merchant on a regular basis.

In the present embodiment, the system 100 builds subscription orders for a particular product on a day determined in accordance with the terms of the accepted subscription offer. The system 100 can create a file corresponding to that subscription order and transmit that file to the merchant's website via an application program interface (API) 118 provided by the system.

The merchant backend 120 fulfills the order in accordance with their pre-existing practices. The system 100 builds subsequent subscription related orders 110 in accordance with the terms of the subscription.

In some embodiments, the system 100 allows the merchant's customers to access and manage the customer's subscriptions via a subscription interface 102. The system 100 can inject the customer interface 102 into the merchant's website. The content of the subscription interface can be rendered based on the merchant's ID, a randomly generated hash which acts as a password, and/or among other information. After logging into that particular merchant's website, a customer can view their subscriptions related to that merchant and modify the terms of their subscription via the customer interface 102. In addition, the system can accept additional subscriptions from a customer via the customer interface 102.

What is claimed is:

1. A method for determining subscription availability in completing purchase transactions for products over a network, the subscription availability corresponding to whether a subscription exists, data representing a product is available, and a subscription frequency, said method comprising:
    via a network interface, determining a product web page associated with a merchant website is loaded, the product web page pertaining to a product from the merchant website, the merchant website being one of a plurality of merchant websites;
    via the network interface, sending to the merchant website from a subscription platform a widget file pertaining to at least one product from the merchant website;
    via a processor, determining data in a database specifying a subscription availability for the product, a customer, and a merchant identifier to uniquely identify the merchant website from any of the other plurality of merchant websites, said data in a database comprising information, said information comprising at least one subscription offer, the at least one subscription offer associated with at least one product;
    via the network interface, sending the at least one subscription offer to the merchant website, wherein sending the at least one subscription offer includes:
        injecting a portion of the at least one subscription offer into a portion of a user interface displaying the product web page of the merchant website to display the at least one subscription offer, wherein the portion of the at least one subscription offer is adapted to integrate for simultaneous presentation of the product web page pertaining to the product associated with the merchant website associated with the merchant identifier;
    via the processor, monitoring a shopping cart of the customer to track cart information including cart events, at least one cart event is an acceptance of the at least one subscription offer, said shopping cart comprising the at least one product;
    via the network interface, tracking the cart information via a subscription tracker via sending the cart information to the subscription tracker;
    via the network interface, sending the cart information to the processor from the subscription tracker;
    via the processor, determining from the cart information a subscription frequency for the at least one product and the customer, said subscription frequency including subscription information associated with the product, wherein the cart information comprises at least one of the following:
        a time associated with the accepting of the at least one subscription offer;
        at least one product identifier; and
        a description of the at least one product;
    via the network interface, displaying editable subscription frequency information in the shopping cart of the customer for at least one of the at least one products;
    via the network interface, receiving via the widget file an indication that the customer of the merchant website accepted the at least one subscription offer; and
    via the network interface, sending at least one subscription order pertaining to the accepted subscription offer to the merchant website, the at least one subscription order being modifiable based on the editable subscription frequency of the product.

2. The method of claim 1 further comprising:
    deploying to the merchant website a module as the widget file to convey to the merchant website terms of the at least one subscription offer.

3. The method of claim 1 further comprising via the processor, creating a subscription order pertaining to the accepted subscription offer at a time indicated in the accepted subscription offer.

4. An apparatus for determining subscription availability in completing purchase transactions for products over a network, the subscription availability corresponding to whether a subscription exists, data representing a product is available, and a subscription frequency, said apparatus comprising:
    a network interface;
    a processor at a subscription platform; and
    a memory in communication with the processor and storing processor executable instructions which when executed by the processor cause the processor to execute a method comprising:
    via a network interface, determining a product web page associated with a merchant website is loaded, the product web page pertaining to a product from the merchant website, the merchant website being one of a plurality of merchant websites;
    via the network interface, sending to the merchant website a widget file pertaining to at least one product from the merchant website;
    via the processor, determining data in a database specifying a subscription availability for the product, a customer, and a merchant identifier to uniquely identify the merchant website from any of the other plurality of merchant website, said data in a database comprising information, said information comprising at least one subscription offer, the at least one subscription offer associated with at least one product;
    via the network interface, sending the at least one subscription offer to the merchant website, wherein sending the at least one subscription offer includes:
        via the processor, injecting a portion of the at least one subscription offer into a portion of a user interface displaying the product web page of the merchant website to display the at least one subscription offer, wherein the portion of the at least one subscription offer is adapted to integrate for simultaneous presentation of the product web page pertaining to the product associated with the merchant website associated with the merchant identifier;
    via the processor, monitoring a shopping cart of the customer to track cart information including cart events, at least one cart event is an acceptance of the at least one subscription offer, said shopping cart comprising the at least one product;
    via the network interface, tracking the cart information via a subscription tracker via sending the cart information to the subscription tracker;

via the network interface, sending the cart information to the processor from the subscription tracker;

via the processor, determining from the cart information a subscription frequency for the at least one product and the customer, said subscription frequency including subscription information associated with the product, wherein the cart information comprises of at least one of the following:

a time associated with the accepting of the at least one subscription offer;

at least one product identifier; and a description of the at least one product;

via the network interface, displaying editable subscription frequency information in the shopping cart of the customer for at least one of the at least one products;

via the network interface, receiving via the widget file an indication that the customer of the merchant website accepted the at least one subscription offer; and via the network interface, sending at least one subscription order pertaining to the accepted subscription offer to the merchant website, the at least one subscription order being modifiable based on the editable subscription frequency of the product.

5. The apparatus of claim 4 further comprising via the processor, creating a subscription order pertaining to the accepted subscription offer at a time indicated in the accepted subscription offer.

6. The apparatus of claim 4 further comprising via the network interface, deploying to the merchant website a module as the widget file to convey to the merchant web site terms of the subscription offer.

7. The apparatus of claim 4 further comprising via the network interface, deploying to the merchant website a module to convey to the merchant website an application program interface to receive the subscription order pertaining to the accepted subscription offer.

8. A non-transitory computer readable storage medium at a subscription platform storing processor readable instructions which when executed by a processor cause the processor to execute a method for determining subscription availability in completing purchase transactions for products over a network, the subscription availability corresponding to whether a subscription exists, data representing a product is available, and a subscription frequency, said method comprising:

via a network interface, determining a product web page associated with a merchant website is loaded, the product web page pertaining to a product from the merchant web site;

via the network interface, sending to the merchant website a widget file pertaining to at least one product from the merchant website;

via the processor, determining data in a database specifying a subscription availability for the product and a customer, said data in a database comprising information, said information comprising at least one subscription offer, the at least one subscription offer associated with at least one product;

via the network interface, sending at least one subscription offer to the merchant website, wherein sending the at least one subscription offer includes:

injecting a portion of the at least one subscription offer into a portion of a user interface displaying the product web page of the merchant website to display the at least one subscription offer, wherein the portion of the at least one subscription offer is adapted to integrate for simultaneous presentation of the product web page pertaining to the product associated with the merchant website associated with the merchant identifier;

via the processor, monitoring a shopping cart of the customer to track cart information including cart events, at least one cart event is an acceptance of the at least one subscription offer, said shopping cart comprising the at least one product;

via the network interface, tracking the cart information via a subscription tracker via sending the cart information to the subscription tracker;

via the network interface, sending the cart information to the processor from the subscription tracker;

via the processor, determining from the cart information a subscription frequency for the at least one product and the customer, said subscription frequency including subscription information associated with the product, wherein the cart information comprises of at least one of the following:

a time associated with the accepting of the at least one subscription offer;

at least one product identifier; and a description of the at least one product;

via the network interface, displaying editable subscription frequency information in the shopping cart of the customer for at least one of the at least one products;

via the network interface, receiving via the widget file an indication that the customer of the merchant website accepted the at least one subscription offer; and via the network interface, sending at least one subscription order pertaining to the accepted subscription offer to the merchant website, the at least one subscription order being modifiable based on the editable subscription frequency of the product.

9. The non-transitory computer readable storage medium of claim 8 further comprising:

deploying to the merchant website a module as the widget file to convey to the merchant website terms of the at least one subscription offer.

10. The non-transitory computer readable storage medium of claim 8 further comprising via the processor, creating a subscription order pertaining to the accepted subscription offer at a time indicated in the accepted subscription offer.

* * * * *